(No Model.)
K. CRIST.
SAW SET.
No. 250,347. Patented Dec. 6, 1881.
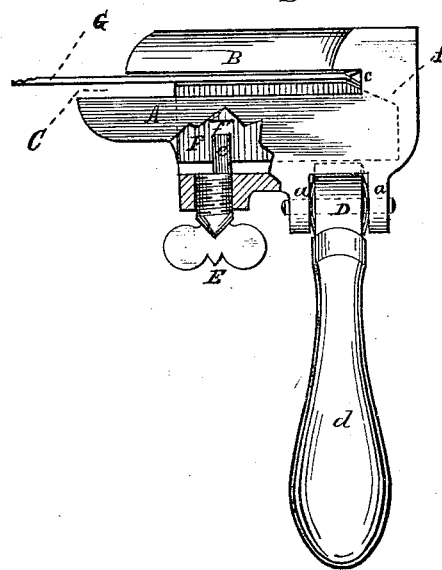
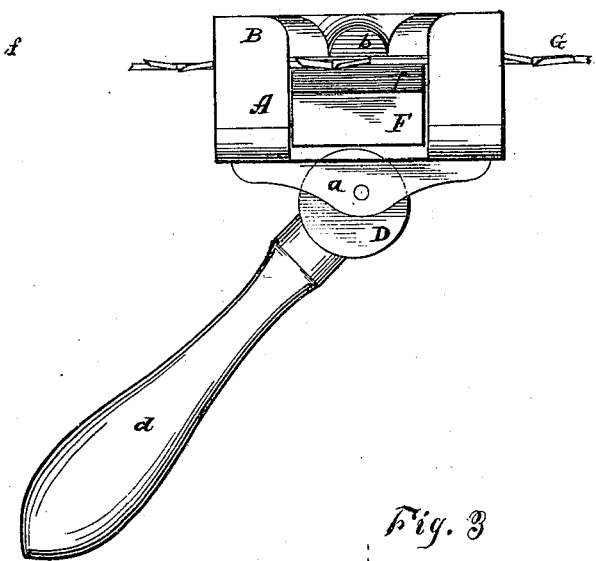
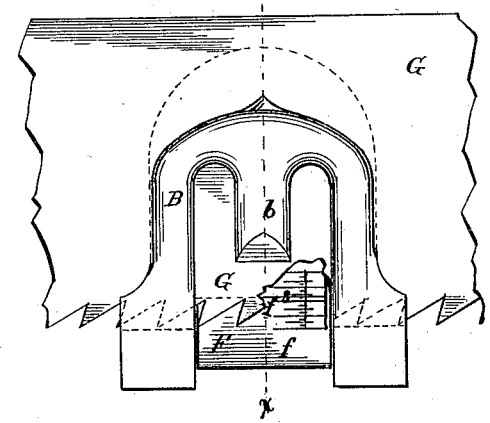
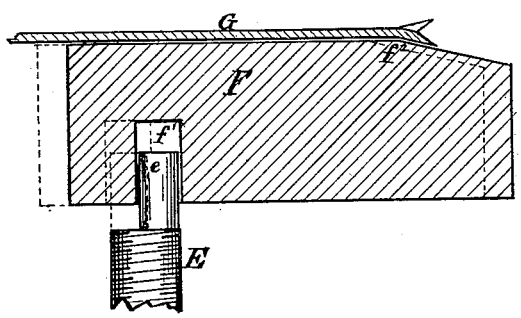
Attest:
C. G. Miller
N. Robinson
Inventor,
Kendall Crist
pr T. Van Kannel
atty.

UNITED STATES PATENT OFFICE.

KENDALL CRIST, OF LAWRENCEBURG, INDIANA.

SAW-SET.

SPECIFICATION forming part of Letters Patent No. 250,347, dated December 6, 1881.

Application filed August 29, 1881. (No model.)

*To all whom it may concern:*

Be it known that I, KENDALL CRIST, of Lawrenceburg, county of Dearborn and State of Indiana, have invented a new and useful Improvement in Saw-Sets; and I do hereby declare that the following is a full, clear, and exact description of the same, reference being had to the annexed drawings, making a part of this specification.

Figure 1 is a side elevation. Fig. 2 is a front elevation. Fig. 3 is a plan, and Fig. 4 is a longitudinal vertical section, enlarged, taken in line $x$ of Fig. 3.

Similar letters of reference indicate like parts.

The nature of my invention relates to that class of saw-sets where the tooth is set or bent by a blow of a hammer or other like instrument.

It consists, mainly, of an irregular-shaped casting, taking the saw-blade in by a narrow slot, the bottom of which acts as a stop for the blade, and of a device for clamping the blade of the saw firmly near the base of the saw-tooth, so that the setting of the teeth may be permanent.

It further consists of a device for adjusting the implement for saws having teeth of varying height, so that all the teeth may be curved or bent at a uniform distance from their points.

It has been found where any elastic metal, as steel, when bent to a given angle, the part bent has a tendency to regain its former state on meeting with concussion or agitation. So in the case of saw-teeth, when they are bent, unless the base of the tooth is held firmly a large proportion of the bending is but a springing process, and when the saw is used these teeth, to some extent, return to their former position.

In construction my invention is as follows: The main casting, which is of an irregular shape, has the lower jaw, A, and an upper jaw, B, both permanent, the mouth C being of such width as to permit the entrance of any saw-blade to be operated on. The upper jaw, B, is provided from the rear and center with a permanent tongue, $b$, beveled at its end, as shown. The lower jaw, A, has two lips, $a\ a$, below, between and to which is pivoted the eccentric D, provided with a suitable handle, $d$. It also carries a screw, E, having its upper end formed into a cylindrical point, $e$, which is out of line with the axis of the screw.

F is a rectangular block of hard metal, its two sides fitting snugly in the recess provided for it in the lower jaw, A, and rests on eccentric D. The upper front part of F is beveled, as shown at $f$, which determines the amount of set to be given the saw-teeth. Block F also has a transverse groove, $f'$, in its lower side, with which point $e$ engages, as represented in the drawings.

The operation of my invention is as follows: The blade of the saw G is placed in the mouth or slot C, the points of the teeth resting against the rear wall, $c$. The screw E is then rotated until the obtuse angle $f^2$ of block F rests under the base of the tooth. This adjustment now serves for the setting of the entire saw. The handle $d$ now being drawn to either side, the eccentric D will elevate block F and firmly clamp the saw between itself and tongue $b$. The operator now strikes every alternate tooth with the peen of his hammer, which depresses all the teeth exposed that point downward. The blade being firmly held in the implement, the bending of the tooth is thorough and the tooth will not spring back, as the particles of the steel have been rearranged. The operator now releases the blade by drawing handle $d$ downward, moves the blade onward, keeping the teeth against stop $c$, so as to expose another series of teeth, which are served in the same way, and so on.

In Fig. 3 is seen a graduation marked on the beveled side of block F at $f^3$, which may be used to determine the point of bending the tooth either in connection with or independent of adjusting-screw E.

This set is adapted for both straight or circular saws, and can be easily operated, performing its work in a uniform and efficient manner.

Having thus described my invention, what I claim as new, and desire to secure by Letters Patent, is—

1. The saw-set herein described, having permanent jaws A and B, in combination with clamping-block F, as and for the purpose herein set forth.

2. The eccentric-screw E, engaging with clamping-block F to adjust angle $f^2$ of the same with relation to permanent stop $c$, as and for the purpose described.

3. The eccentric D and handle $d$, in combination with clamping-block F and tongue $b$, as and for the purpose specified.

KENDALL CRIST.

Attest:
GEORGE W. ROBERTS,
I. CRIST.